United States Patent [19]

Kawachi et al.

[11] Patent Number: 5,050,411
[45] Date of Patent: Sep. 24, 1991

[54] SHIFT LEVER LOCKING DEVICE FOR AUTOMATIC TRANSMISSION OF COLUMN TYPE

[75] Inventors: Tomonori Kawachi; Minoru Morikawa; Noriyuki Suzuki; Masami Watanabe; Nobuyoshi Yasuhara; Yoshitaka Sato, all of Aichi, Japan

[73] Assignee: Kabushiki Kaisha Tokai Rika Denki Seisakusho, Aichi, Japan

[21] Appl. No.: 542,629

[22] Filed: Jun. 25, 1990

[30] Foreign Application Priority Data

Jun. 26, 1989 [JP] Japan .................. 1-74797[U]

[51] Int. Cl.⁵ ............................................. E05B 65/12
[52] U.S. Cl. ...................................... 70/248; 70/201; 70/245
[58] Field of Search ................. 70/247, 248, 201, 202, 70/209, 245; 74/475, 477, 850; 180/271, 287

[56] References Cited

U.S. PATENT DOCUMENTS

| 4,520,640 | 6/1985 | Kramer | 70/248 |
| 4,712,397 | 12/1987 | Niskanen | 70/248 |
| 4,821,605 | 4/1989 | Dziobe | 70/248 |
| 4,932,493 | 6/1990 | Sakurai | 180/271 |
| 4,934,209 | 6/1990 | Dewitt | 70/248 |

FOREIGN PATENT DOCUMENTS 49-21172  5/1974 Japan .
56-174330 12/1981 Japan .

Primary Examiner—Robert L. Wolfe
Attorney, Agent, or Firm—Finnegan, Henderson, Farabow, Garrett and Dunner

[57] ABSTRACT

In a shift lever locking device for an automatic transmission of column type, a drive cam is turned with a key rotor mounted on a steering column, a shift shaft arranged along the steering column is turned by operating a shift lever so that the automatic transmission is shifted to a plurality of positions, a lock part is formed on the shift shaft, a link mechanism provided movably has at least a lever which is swung to operate in a link mode a drive part confronting with the driving cam of the key rotor and a lock member confronting with the lock part of the shift shaft; and an adjusting mechanism is provided for the lever of the link mechanism to adjust the positional relationships between the driving cam and the drive part and between the lock part and the lock member, whereby the assembling errors are absorbed which may be involved in assembling work.

12 Claims, 17 Drawing Sheets

SHIFT LEVER LOCKING DEVICE FOR AUTOMATIC TRANSMISSION OF COLUMN TYPE

BACKGROUND OF THE INVENTION

This invention relates to a shift lever locking device for an automatic transmission of column type.

In one example of an automobile with an automatic transmission, a gear shifting operation is carried out by turning a shift lever installed on the steering wheel column. In the automobile, when, with the shift lever set at a o particular position (such as the P position), the key rotor is set at the LOCK position ("off" position), and the ignition key is removed from the key rotor, it is inhibited to move the shift lever to positions other than the P position; and when the shift lever is shifted to a position other than the P position with the key rotor set at an "on" position (such as the ACC position), it is inhibited to move the shift lever from the position to the P position.

The above-described technique has been disclosed by Japanese Patent Application Publication No. 21172/1974 and Japanese Utility Patent Application (OPI) No. 174330/1981 (the term "OPI" as used herein means an "unexamined published application").

However, the technique thus disclosed still suffers from a difficulty that there is unavoidably an assembling error between the position of a key cylinder in the steering column and the position of the shift shaft one end of which is supported on the steering column.

SUMMARY OF THE INVENTION

Accordingly, an object of this invention is to provide a shift lever locking device for an automatic transmission of column type which can be so assembled as to operate as required, absorbing assembling errors at various parts.

The foregoing object and other objects of the invention have been achieved by the provision of a shift lever locking device for an automatic transmission of column type which, according to the invention, comprises: a key rotor mounted on a steering column, the key rotor being turnable between an off position where a key can be engaged with and disengaged from the key rotor and a on position where the key cannot be disengaged from the key rotor; a drive cam turned with the key rotor; a shift shaft arranged along the steering column, the shift shaft being turned by operating a shift lever so that the automatic transmission is shifted to a plurality of positions; a lock part formed on the shift shaft; a link mechanism provided movably which has at least a lever which is swung to operate in a link mode a drive part confronting with the driving cam of the key rotor and a lock member confronting with the lock part of the shift shaft; and an adjusting mechanism provided for the lever of the link mechanism to adjust the positional relationships between the driving cam and the drive part and between the lock part and the lock member, whereby when the shift shaft is shifted to a particular position, the key rotor is allowed to be turned to an off position, so that the shift shaft is locked at the particular position with the aid of the lock part and the lock member, and when, with the key rotor at the on position, the shift lever is shifted to a position other than the particular position, the drive part prevents the driving cam from rotation thereby to prevent the key rotor from being turned to the off position.

The nature, principle and utility of the invention will become more apparent from the following detailed description when read in conjunction with the accompanying drawings, in while like parts are designated by like reference numerals.

BRIEF DESCRIPTION OF THE DRAWINGS

In the accompanying drawings:

FIG. 1 is a sectional view showing essential components of the first embodiment;

FIG. 2 is also a sectional view of the essential components, showing an operating condition different from that which is shown in FIG. 1;

FIG. 3 is a front view of the essential components of the first embodiment;

FIG. 4 is a perspective view of the first embodiment;

FIG. 5 is a side view, with parts cut away, showing a shift shaft and its relevant components in the first embodiment;

FIG. 6 is a plan view, with parts cut away, showing a detent plate and its relevant components;

FIG. 7 is a sectional view taken along line VII—VII in FIG. 6.

FIG. 8 is a side view of the components as viewed in the direction of the arrow VIII in FIG. 3;

FIG. 9 is an exploded perspective view of essential components in the first embodiment;

FIG. 10 is an enlarged exploded perspective view of essential components in the first embodiment;

FIG. 11 is a side view as viewed in the direction of the arrow XI in FIG. 1;

Figure 1:
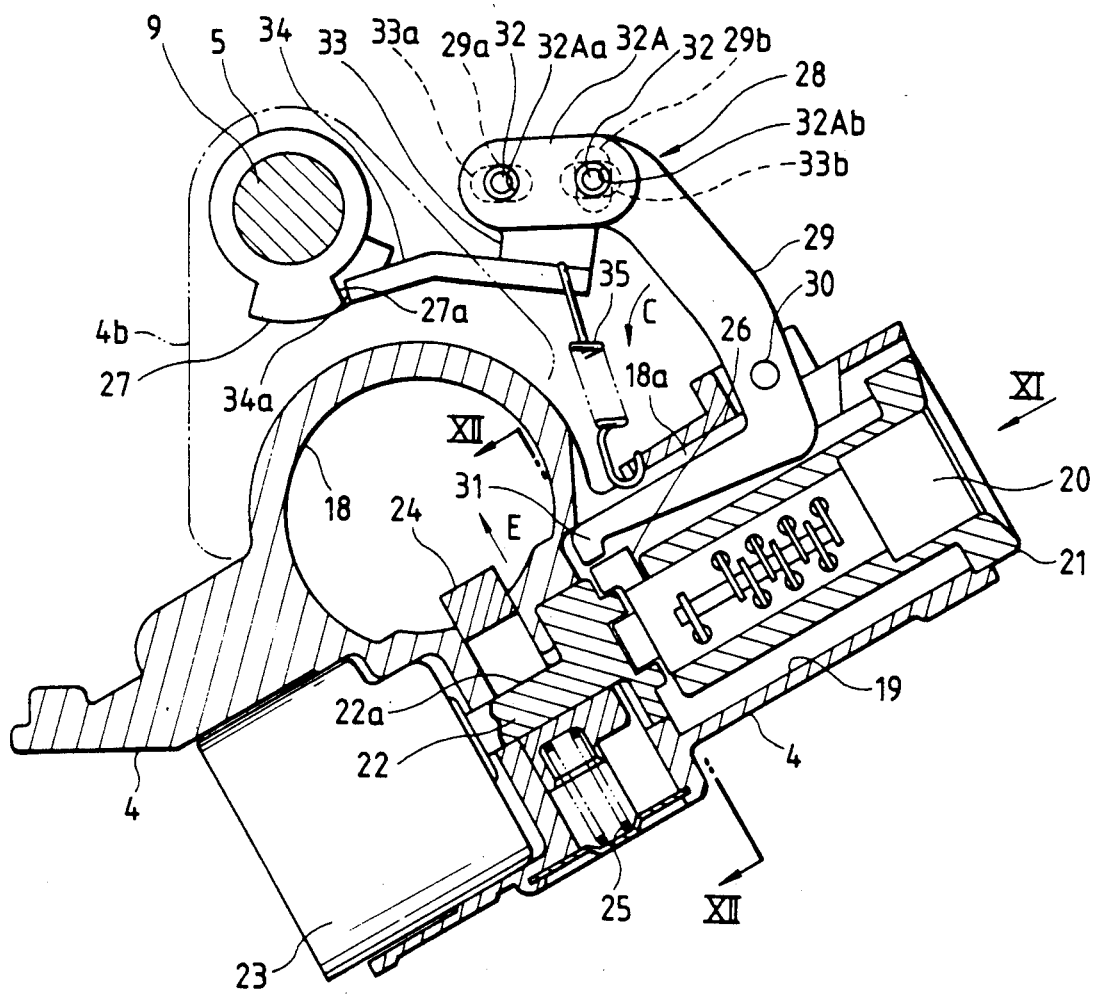
FIGS. 1 through 12 show a first embodiment of this invention; more specifically.
Figures 12A, 12B:
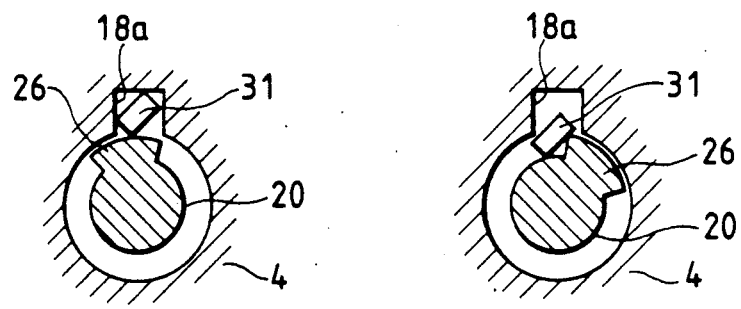
Figure 13:
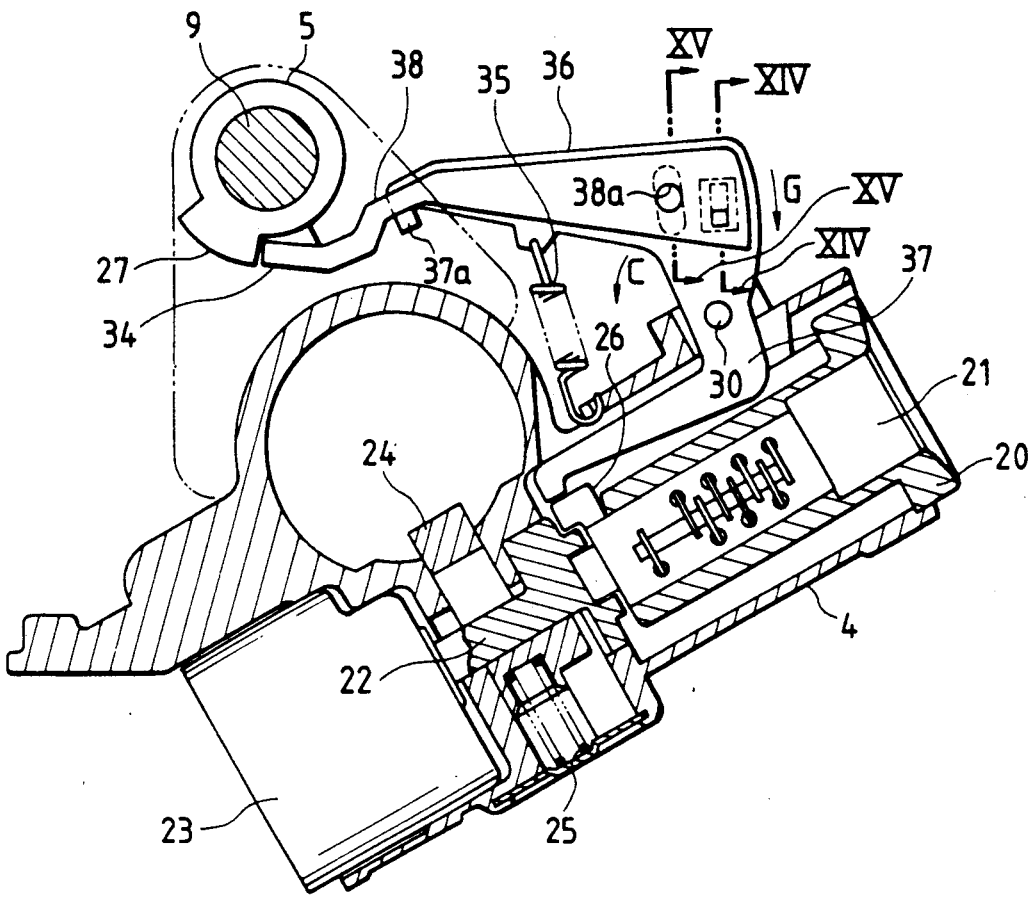
Figure 14:
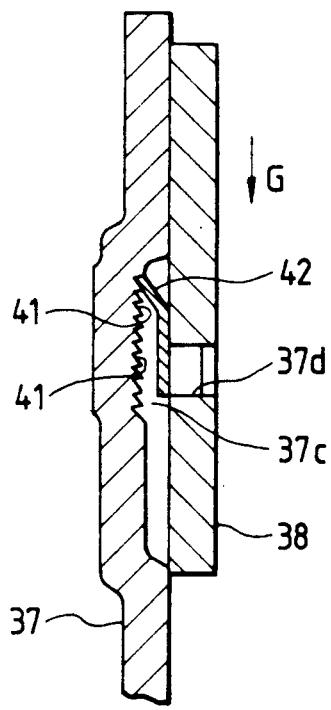
Figure 15:
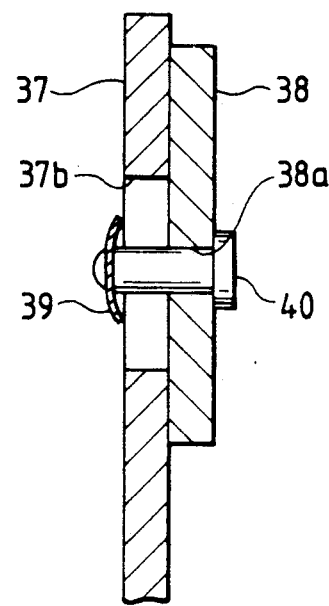
Figure 16:
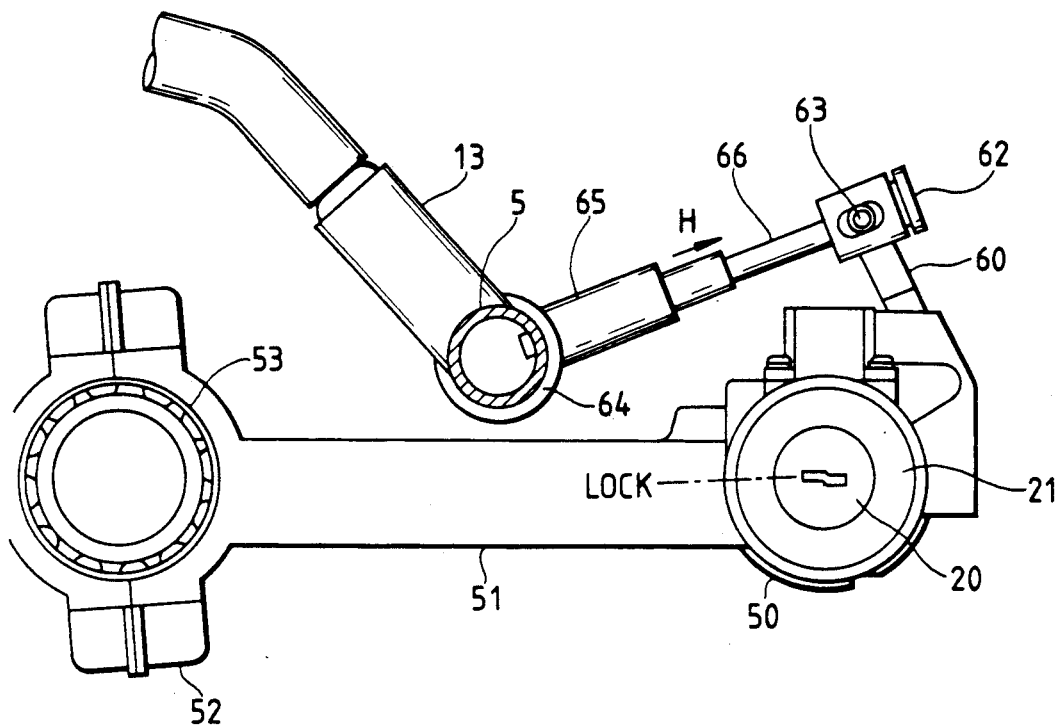
Figure 17:
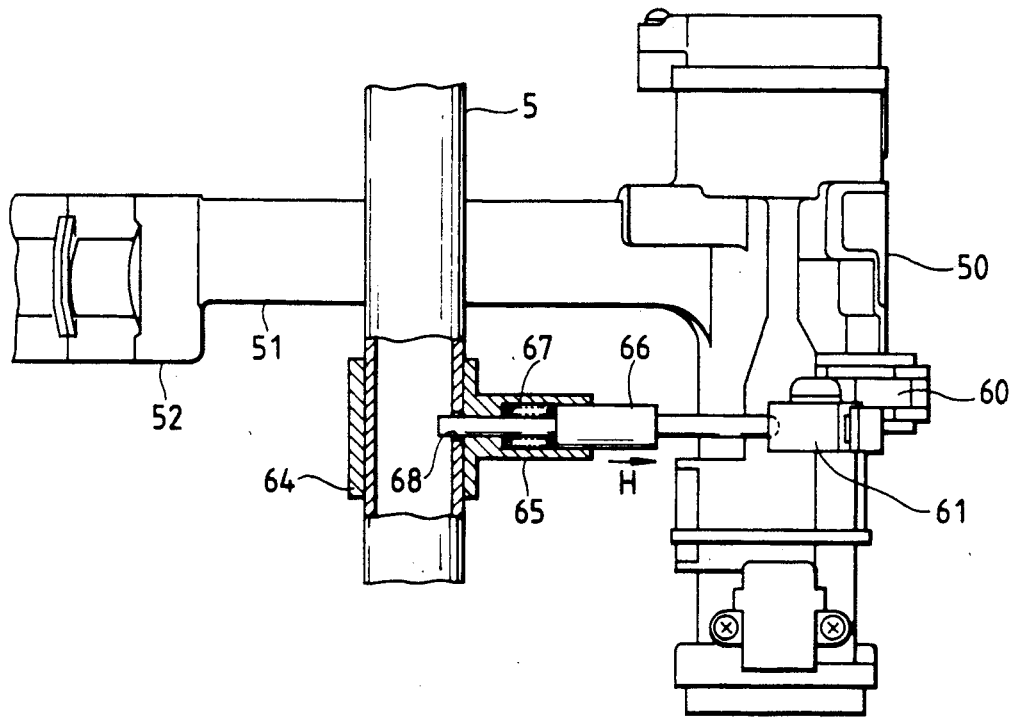
Figure 18:
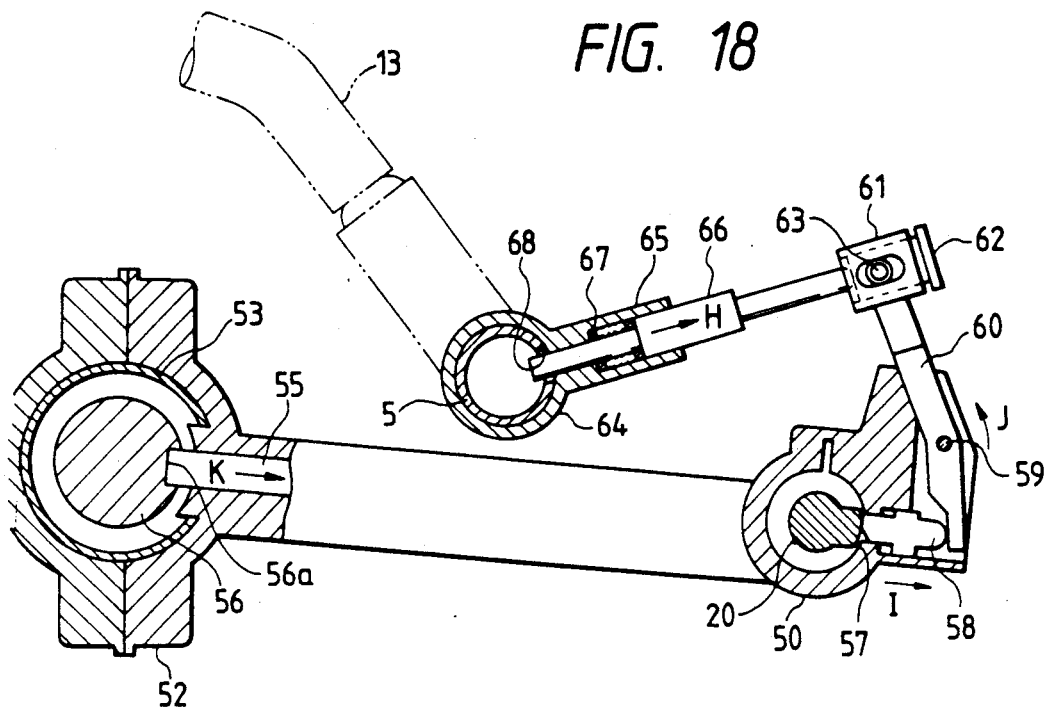
Figure 19:
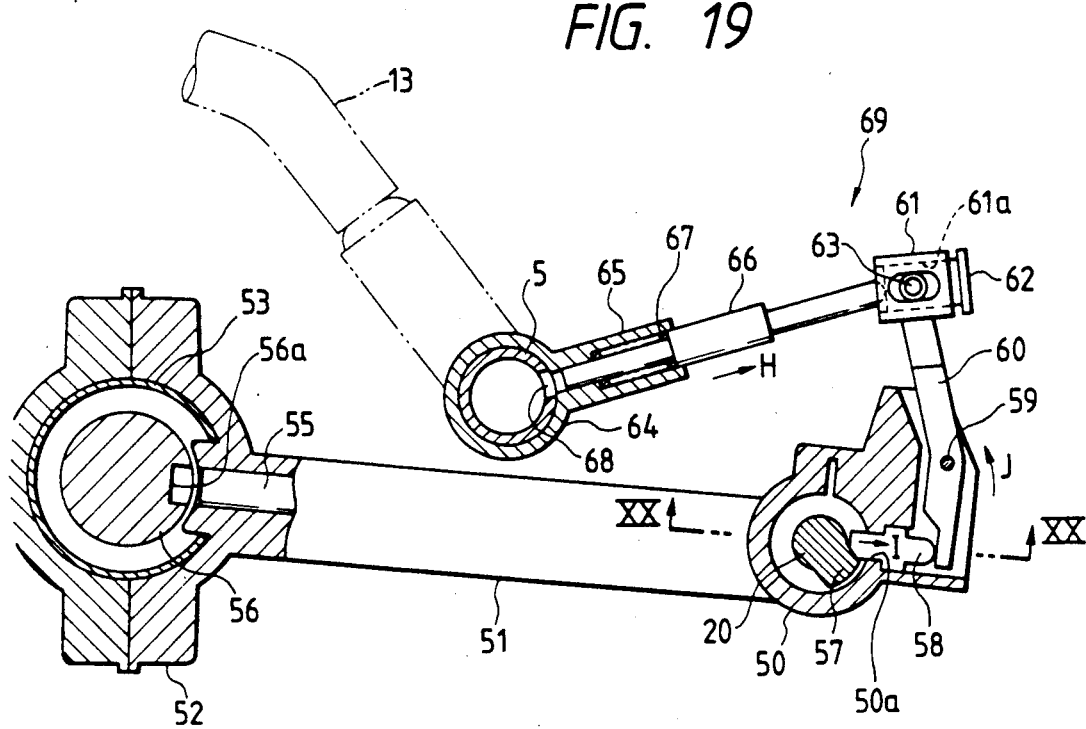
Figure 20:
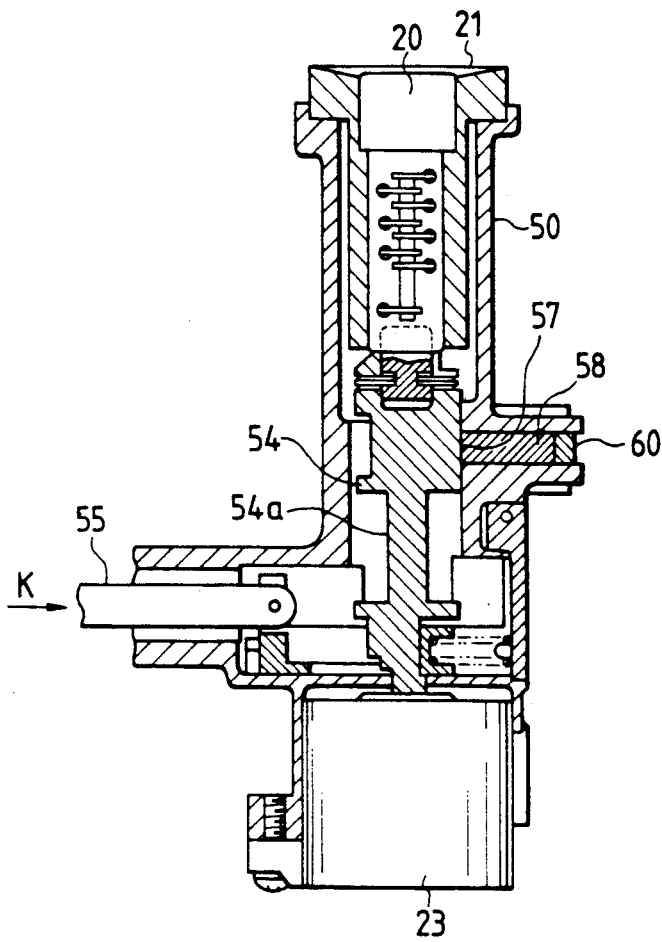
Figure 21:
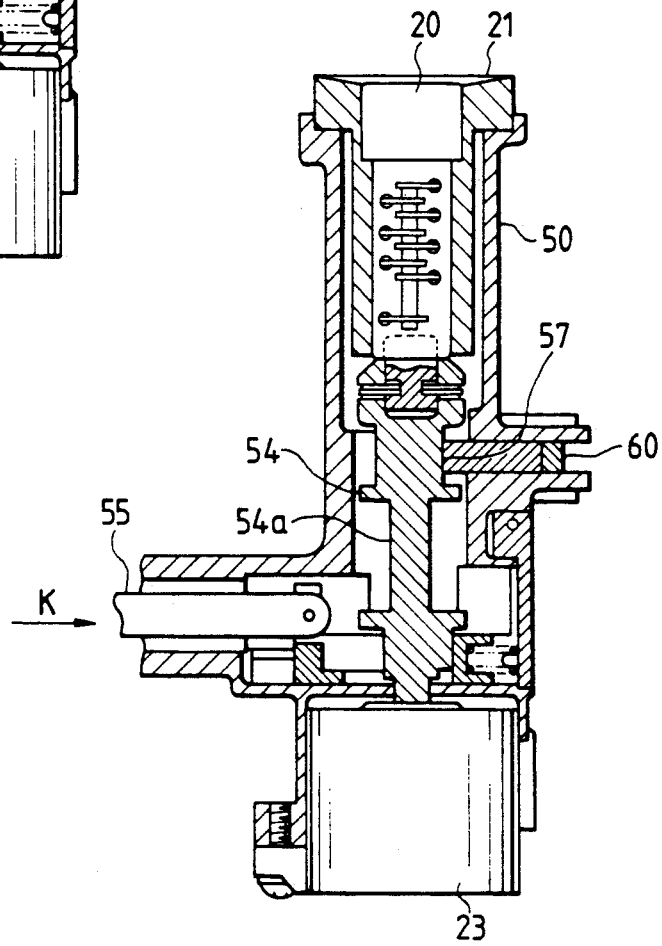
Figure 22:
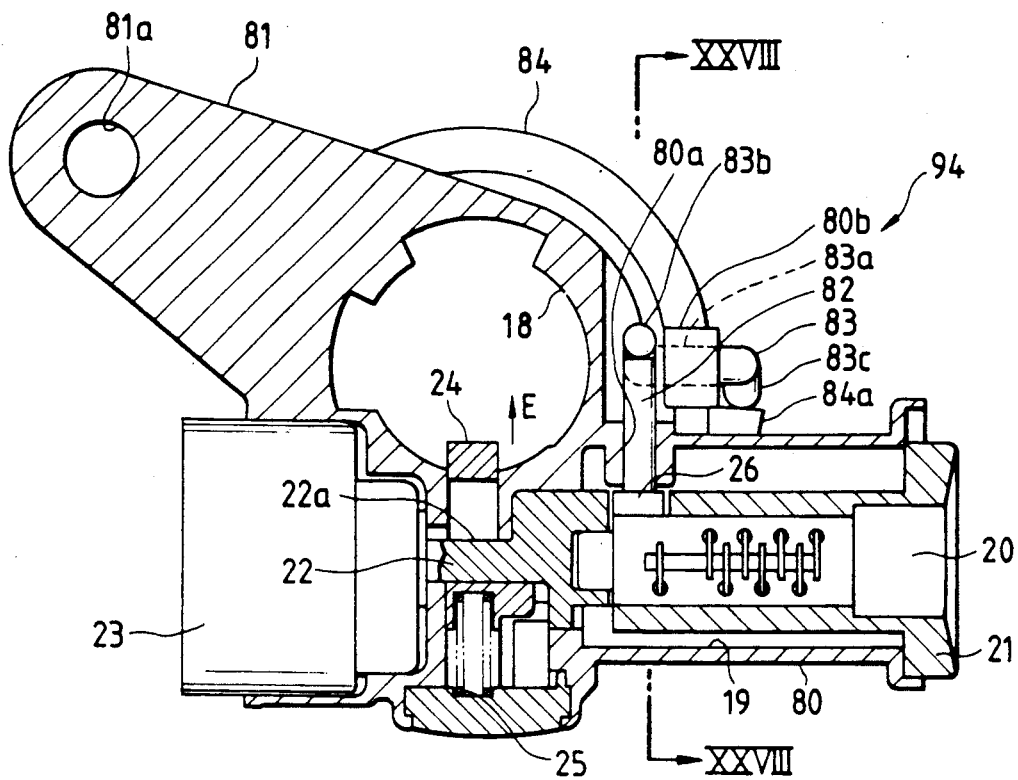
Figure 23:
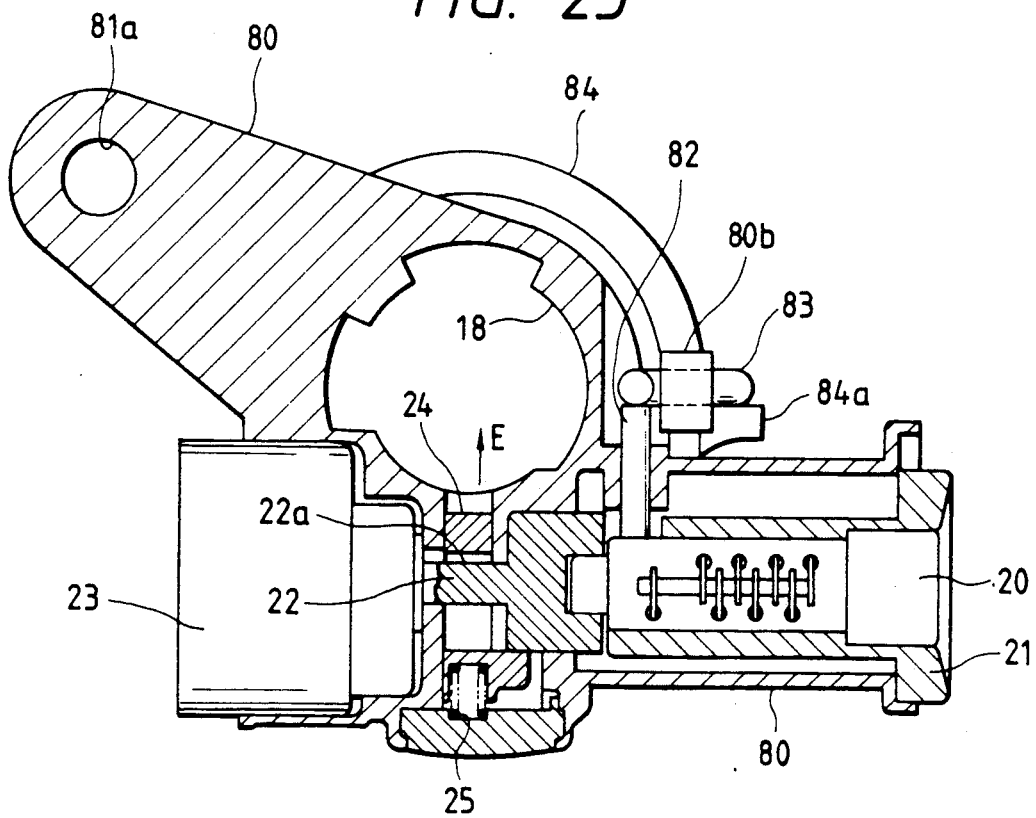
Figure 24:
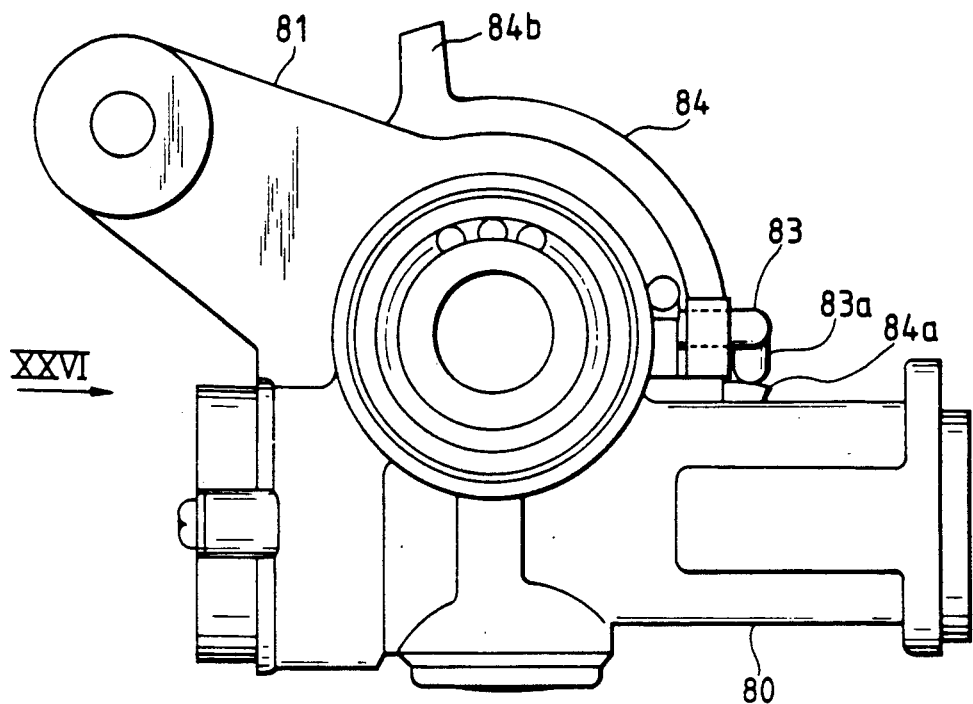
Figure 25:
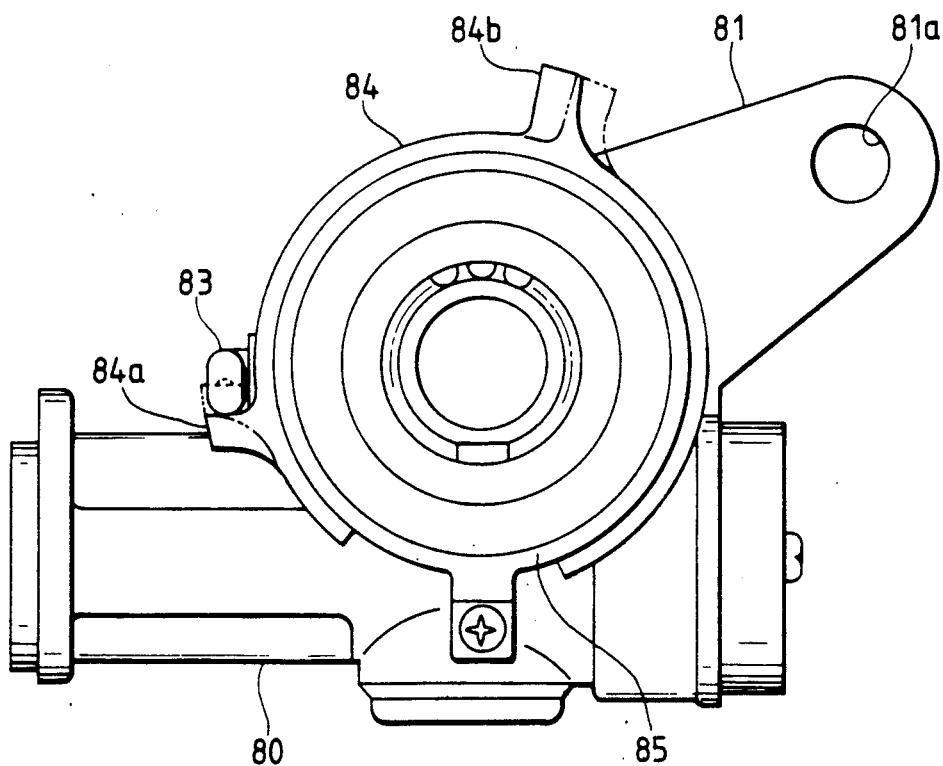
Figure 26:
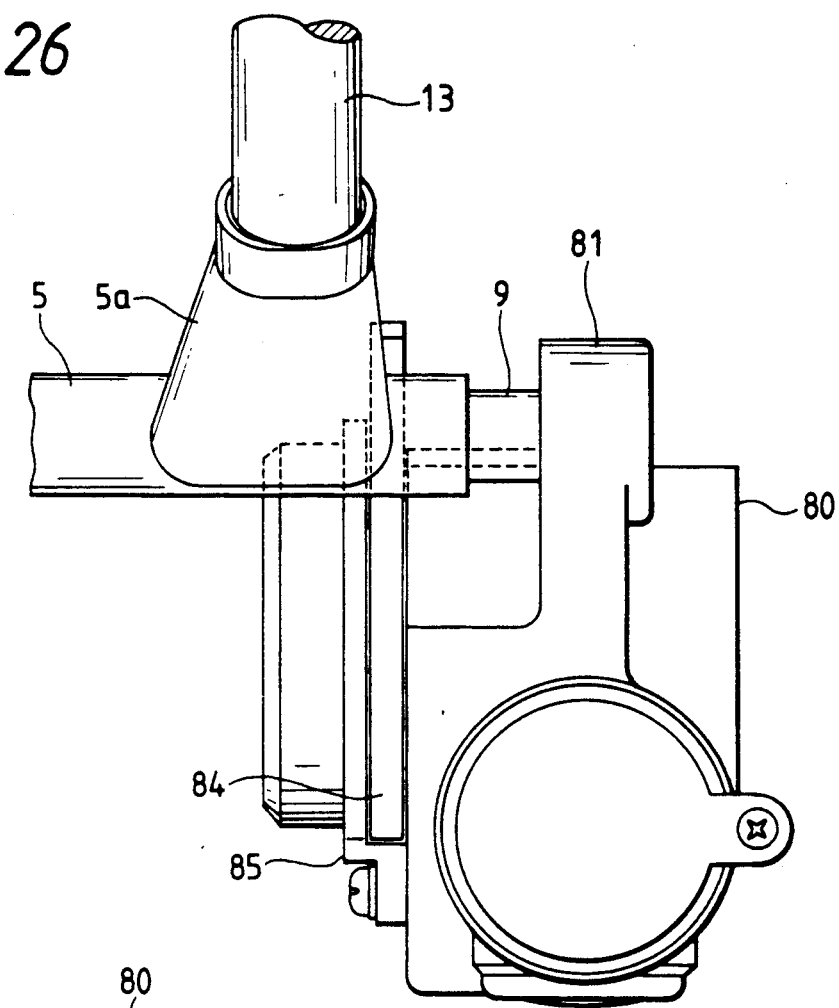
Figure 27:
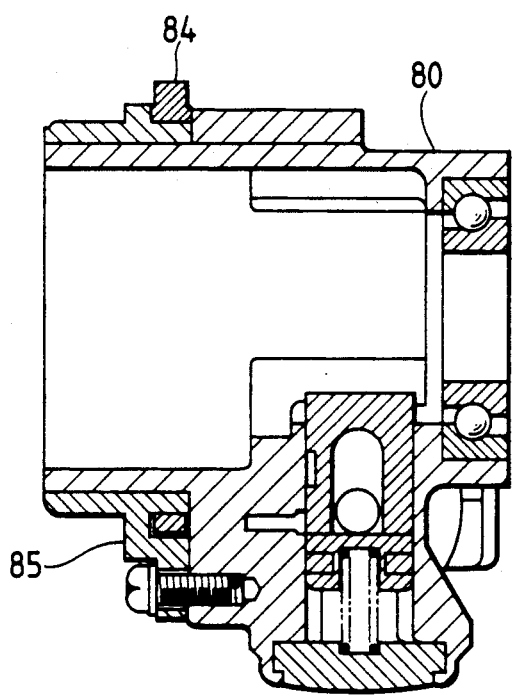
Figure 28:
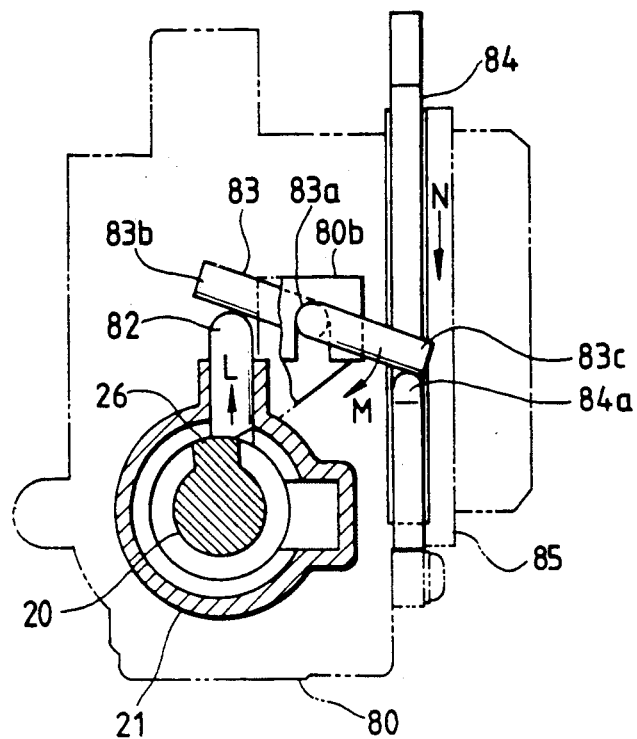
Figure 29:
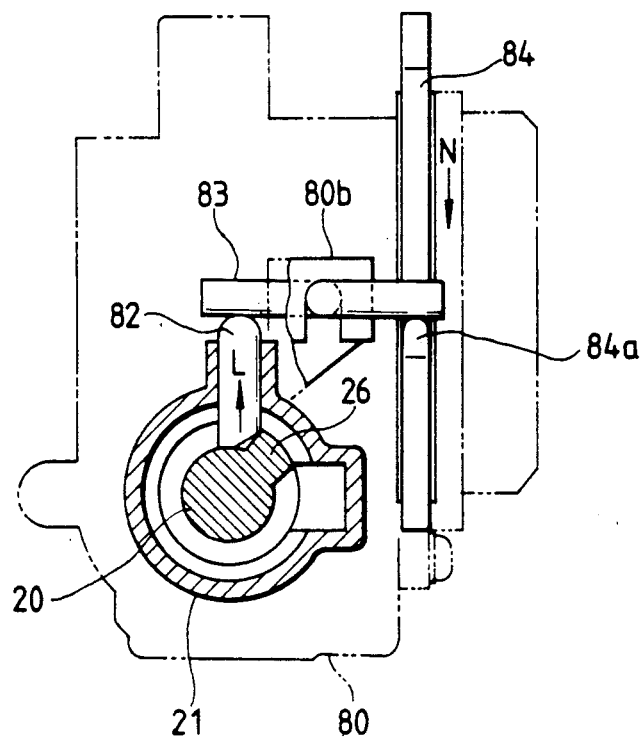
Figure 30:
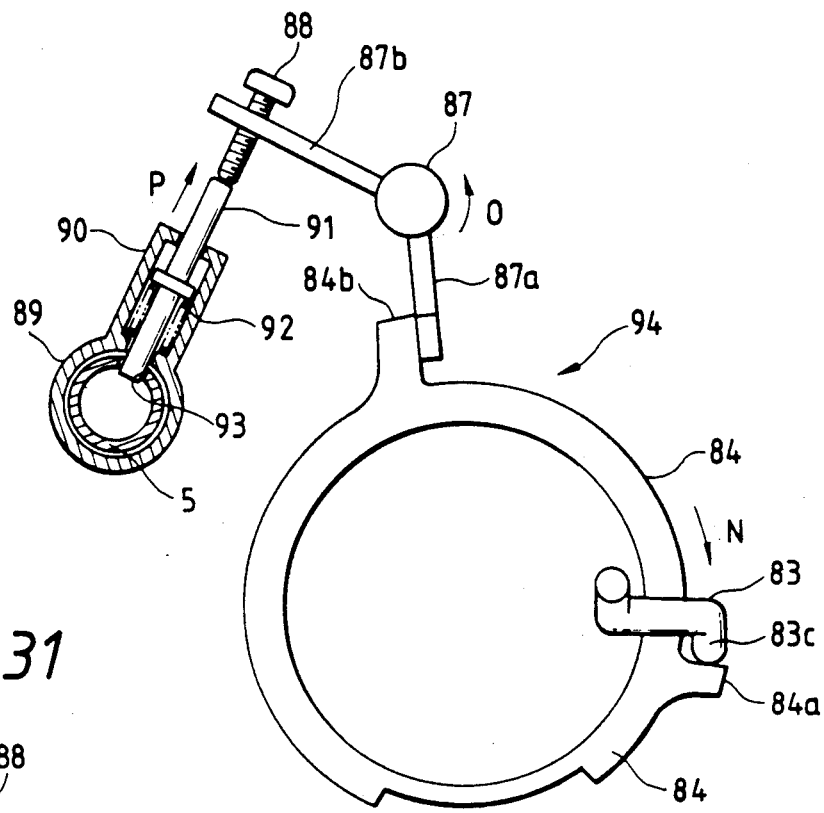
Figure 31:
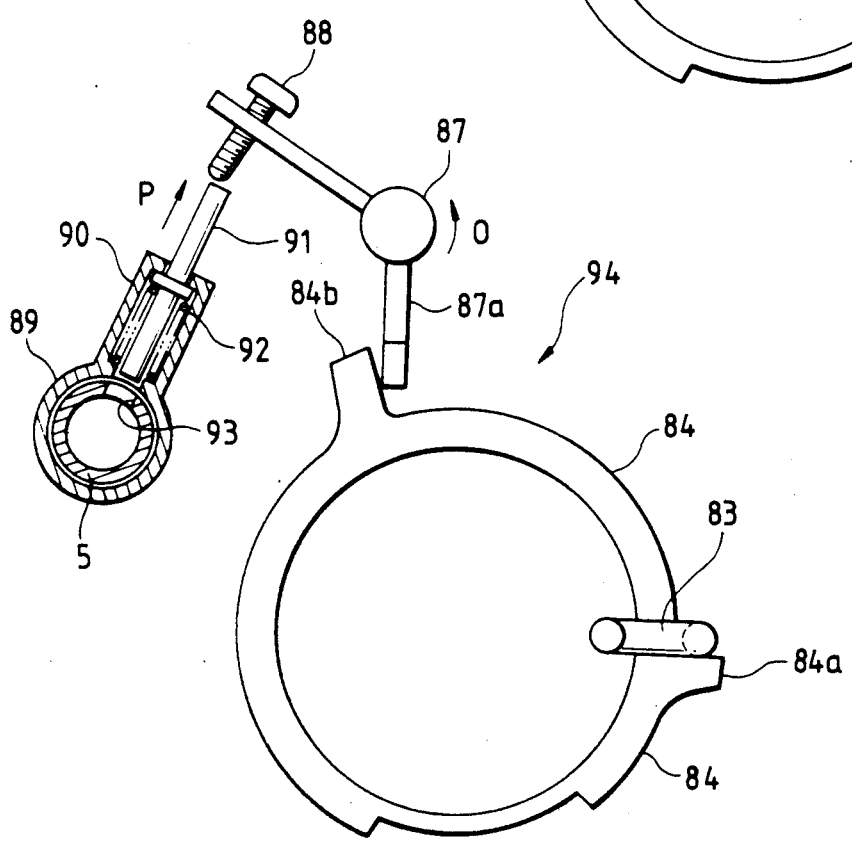
Figure 32:
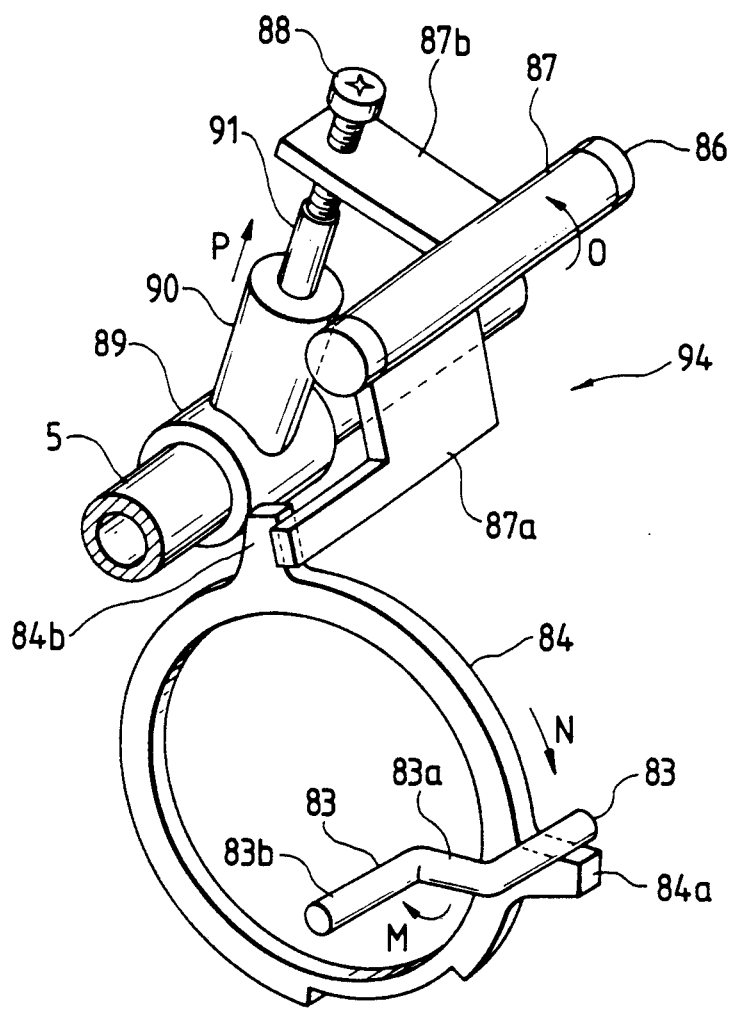

The parts (a) and (b) of FIG. 12 are sectional views of a driving cam, for a description of the operation of the latter;

FIGS. 13 through 15 show a second embodiment of the invention; more specifically, FIG. 13 is a diagram corresponding to FIG. 1;

FIG. 14 is a sectional view taken along line XIV—XIV in FIG. 13;

FIG. 15 is a sectional view taken along line XV—XV in FIG. 13;

FIGS. 16 through 21 show a third embodiment of the invention; more specifically, FIG. 16 is a front view, with parts cut away, showing essential components of the third embodiment;

FIG. 17 is a top view, with parts cut away, showing essential components of the third embodiment;

FIGS. 18 and 19 are side views, with parts cut away, showing essential components of the third embodiment, for a description of essential operations of the third embodiments;

FIGS. 20 and 21 are sectional views taken along line XX—XX in FIG. 19 for a description of essential operations of the third embodiment;

FIGS. 22 through 32 shows a fourth embodiment of the invention; more specifically FIGS. 22 and 23 are sectional views showing essential components of the fourth embodiment, for a description of essential operations of the latter;

FIGS. 24 and 25 a front view and a rear view, respectively, showing essential components of the fourth embodiment;

FIG. 26 is a side view of the essential components as viewed in the direction of the arrow XXVI in FIG. 24;

FIG. 27 is a sectional view showing a cam ring in the fourth embodiment;

FIGS. 28 and 29 are sectional views taken along line XXVIII—XXVIII in FIG. 22, for a description of essential operations of the fourth embodiment;

FIGS. 30 and 31 are explanatory diagrams, partly as sectional diagrams, for a description of essential operations of the fourth embodiment; and FIG. 32 is a perspective view showing essential components of the fourth embodiment.

DETAILED DESCRIPTION OF THE INVENTION

Preferred embodiments of this invention will be described with reference to the accompanying drawings.

A first embodiment of the invention is as shown in FIGS. 1 through 11.

Figure 4:
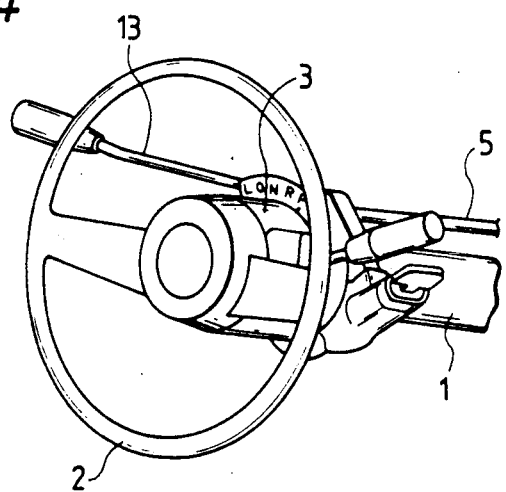
Figure 5:
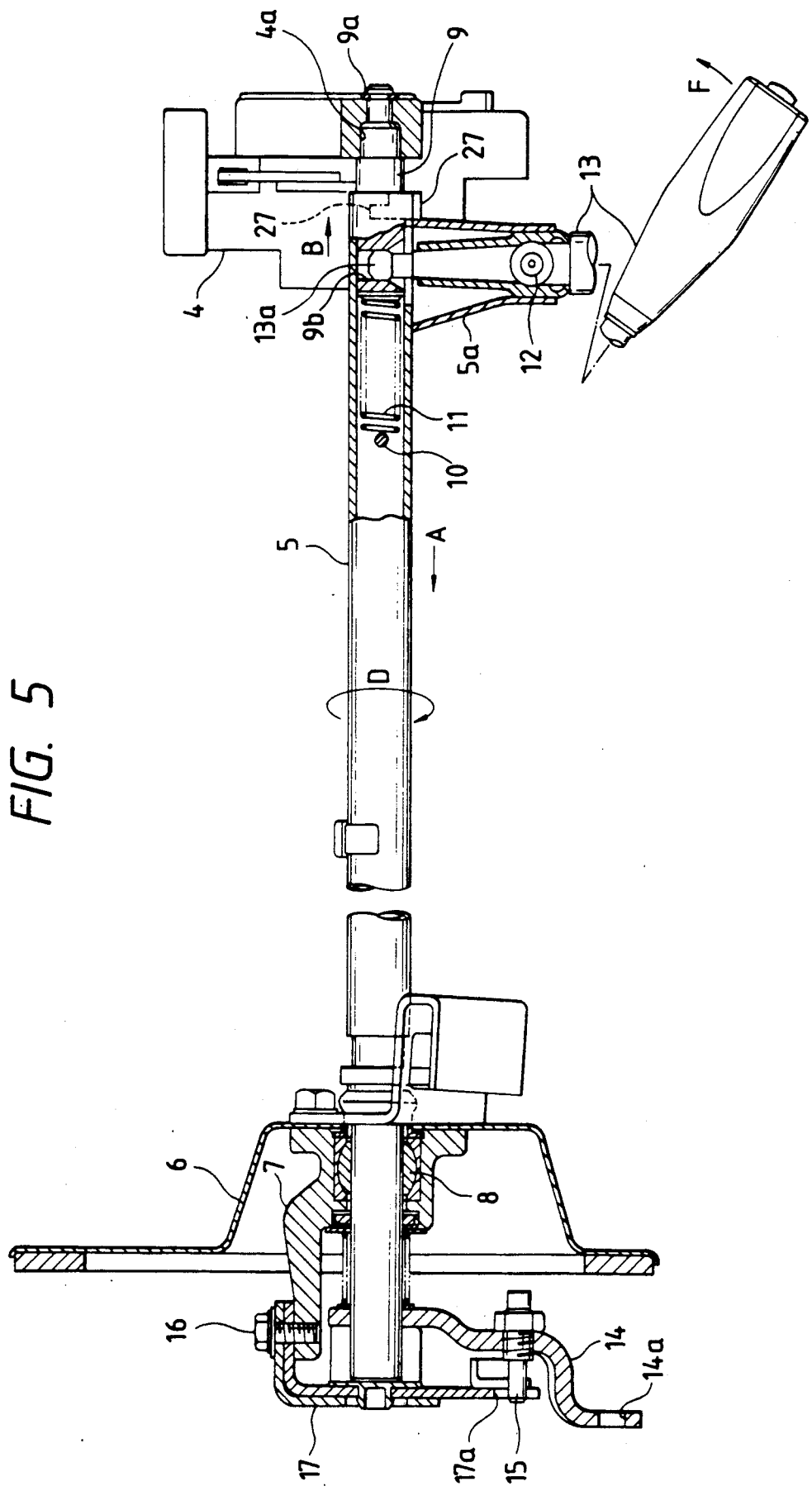

In FIG. 4, reference numeral 1 designates a column cover covering a steering column (not shown); 2, a steering wheel coupled to the front end of the steering column 1; and 3, a turn and wiper switch located right below the steering wheel, the switch 3 being mounted on a body 4 (FIG. 1) provided at the upper end of the steering column; and 5, a shift shaft. As shown in FIG. 5, the front end portion of the shift shaft 5 is rotatably engaged through a shaft member 9 with a supporting hole 4a formed in the body 4, and the rear end portion is pivotally supported through a spherical bearing 8 on a holder 7 which is mounted through a mounting plate 6 on the vehicle body. The shaft member 9 is slidably fitted in the middle portion of the shift shaft 5 which is in the form of a hollow pipe. The front end portion of the shaft member 9 thus fitted is rotatably engaged with the supporting hole 4a, and has a collar 9a so that the shaft member 9 may not be displaced axially. A compression spring 11 is arranged between the rear end portion of the shaft member 9 and a shaft pin 10 penetrating the shift shaft 5 in such a manner as to urge the shift shaft 5 in the direction of the arrow A. The front end portion of the shaft 5 has a cylindrical part 5a which is extended radially outwardly. A shift lever 13 is rotatably coupled through a pin 12 with the end of the cylindrical part 5. The shift lever 13 has an acting part 13a at the end, which is engaged with an engaging groove 9b formed in the shaft member 9. An operating lever 14 is coupled to the rear end portion of the shift shaft 5. The operating lever 14 has a coupling hole 14a into which a rod (not shown) is inserted so as to be coupled to the automatic transmission, and a detent pin 15. As shown also in FIGS. 6 and 7, a detent plate 17 is fixedly secured to the holder 7 with bolts 16. The detent plate 17 has two cuts 17a and two protrusions 17b in correspondence to the positions of the detent pin 15 which is turned with the shift lever 13. The cuts 17a are provided in correspondence to the P, N and D positions; and the protrusions 17a are provided in correspondence to the position between the P and R positions, and to the L position, respectively. The detent plate 17 further has two protrusions 17c at both end portions outside the P and L positions. The two protrusions 17c serve as stoppers.

The body 4 has a through-hole 18 into which the steering shaft (not shown) is inserted, and a through-hole 19 which is substantially perpendicular to the through-hole 18. A key cylinder 21 is provided at one end of the through-hole 19. The key cylinder 21 has a key rotor 20 which is turned with a key (not shown) inserted. The rear end portion of the key rotor 20 is coupled to one end of a lock cam 22, the other end of which is coupled to an ignition switch 23 inserted the other end portion of the through-hole 19. A lock bar 24, which is controlled by the cam part 22a of the lock cam 22, has an end portion which goes in the through-hole 18. The end portion of the lock bar 24 is engaged with an engaging groove (not shown) in the steering shaft by the elastic force of a compression coil spring 25, so as to lock the steering shaft (accordingly the steering wheel).

A driving cam 16 is provided on the outer cylindrical wall of the rear end portion of the key rotor 20. When the key rotor 20 is set at any one of the ACC, ON and START positions (other than the LOCK position ("off" position), as shown in the part (b) of FIG. 12, the driving cam 26 is not confronted with a groove 18a which is communicated with the through-hole 19. When the key rotor 20 is set to the LOCK position, as shown in the part (a) of FIG. 12 the driving cam 26 is confronted with the groove 18a.

As shown in FIGS. 1, 2, 5, 8 and 9, a lock part 27 has a step 27a at the middle is formed on the outer cylindrical wall of the front end portion of the shift shaft 5. The lock part 27 is positioned with a predetermined space behind a flange 4b which is protruded from the body 4 in such a manner as to support the upper end portion of the shaft member 9.

Figure 2:
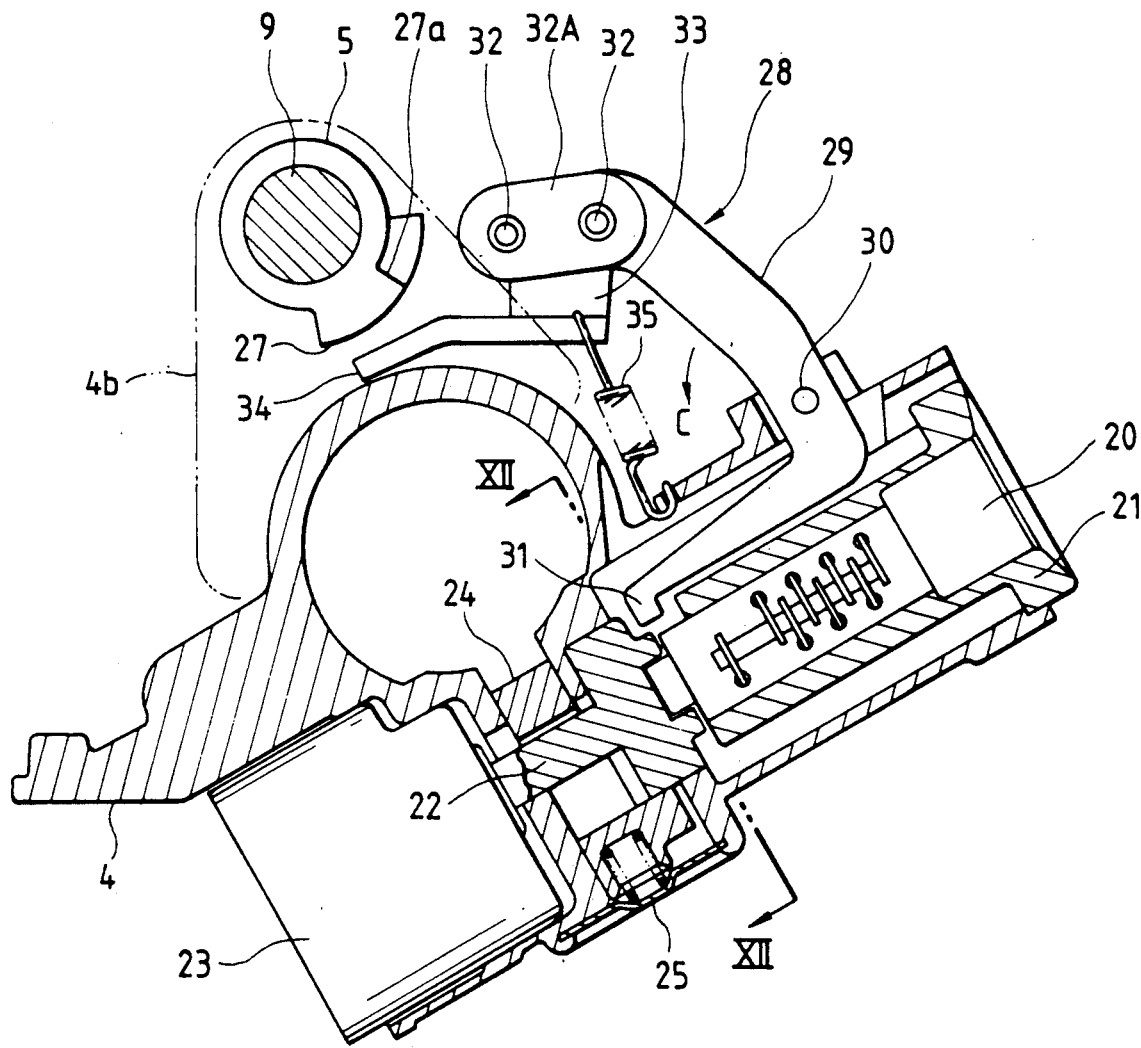
Figure 3:
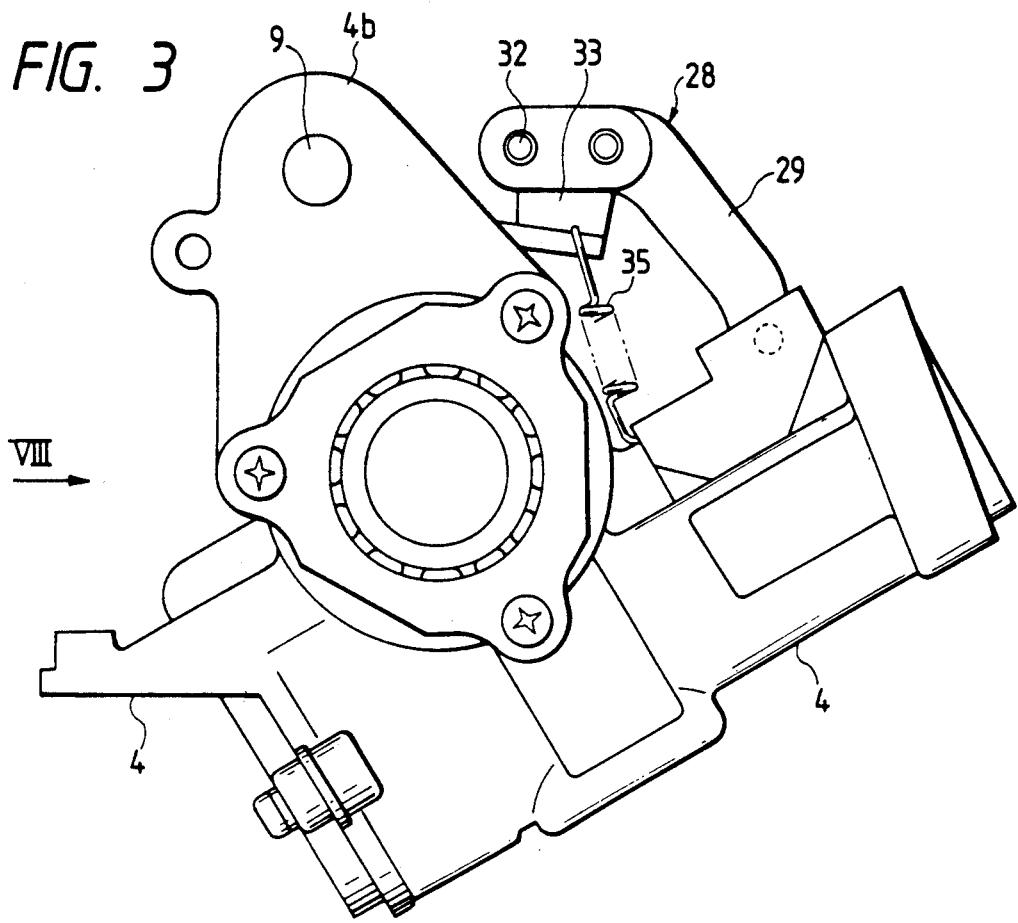
Figure 9:
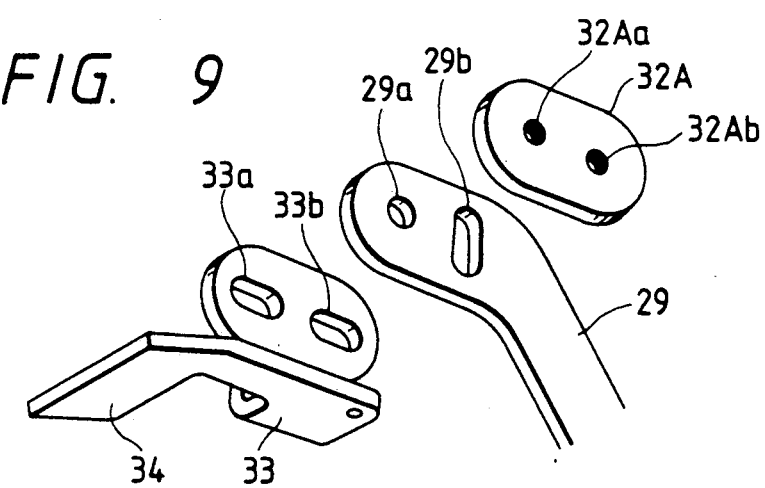

Now, a link mechanism 28 for linking the driving cam 16 of the key rotor 20 and the lock part 27 of the shift shaft 15 with each other will be described. A first lever 29, which is substantially L-shaped, is rotatably supported through a pin 30 on the body 4. One end portion of the first lever 29 is inserted into the body 4 in such a manner as to lie in a groove 18a. The first lever has a drive part 31 at the end of the one end portion. The drive part 31 is inclined about 45° clockwise in FIG. 12 so that it confronts with the driving cam 236 and rides on the driving cam 26 with ease. The other end portion of the first lever 29 is extended outwardly (upwardly) of the body 4 as shown in FIG. 1, and is coupled to a second lever 33 with two adjustment means, namely, screws 32. As shown in FIG. 9, the first lever 29 has a round hole 29a and an elongated hole 29b which is extended perpendicular to the longitudinal direction, and the second lever 33 has two elongated holes 33a and 33b in parallel with the longitudinal direction. One of the screws 32 are screwed through the round hole 19a and the elongated hole 33a into a threaded hole 31Aa formed in an adjusting board 32A, and the other screw 32 is screwed through the elongated holes 29b and 33b into a threaded hole 32Ab formed in the adjusting board 32A, so that the second lever 33 can be adjusted in swing and in length with respect to the first lever 29. As shown in FIGS. 1, 2 and 9, the front end portion of the second lever 33 is formed into a lock member 34 which is engaged with and disengaged from the lock part 27 formed on the outer cylindrical surface of the upper end portion of the shift shaft 5. The "a" surface of the lock member 34 shown in FIG. 9 is moved sliding on the rear surface of the flange 4b of the body 4, so that the rear surface of the flange 4 of the body 4 supports a thrust load acting on the lock member 34 in the direction of the arrow B. A tension coil 35 is connected between the second lever 33 and the body 4 so as to urge the first and second levers 29 and 33 in the direction of the arrow C (FIG. 1).

Figure 6:
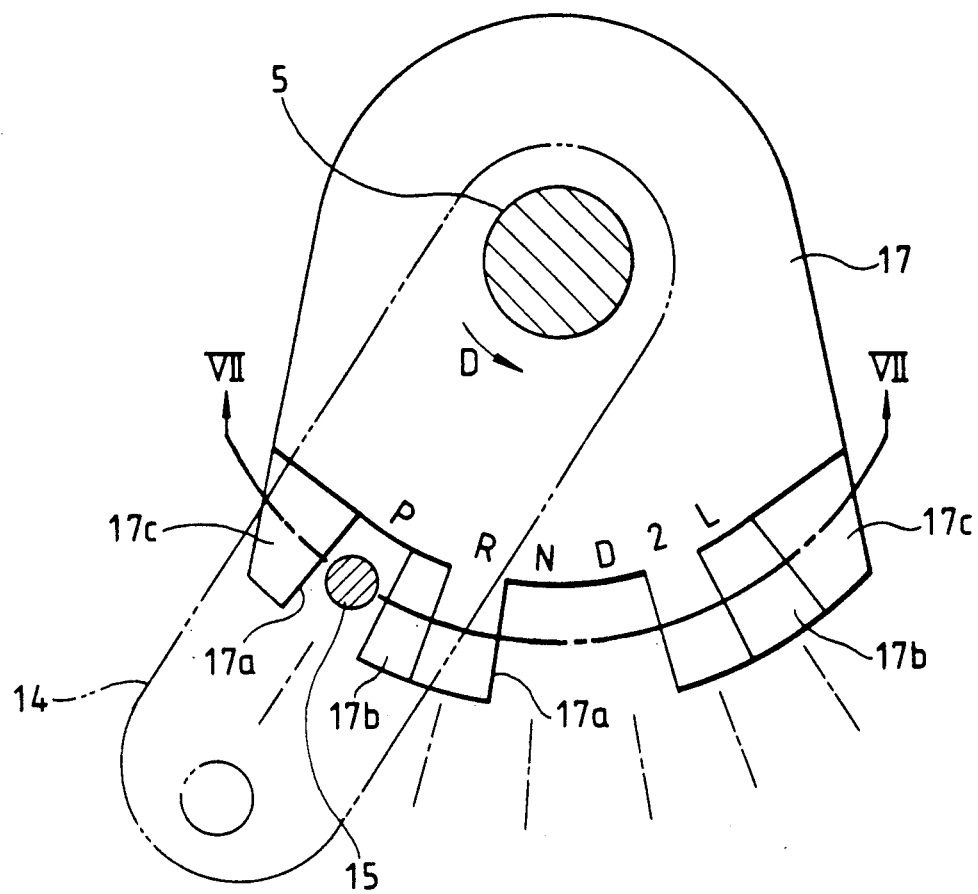
Figure 7:
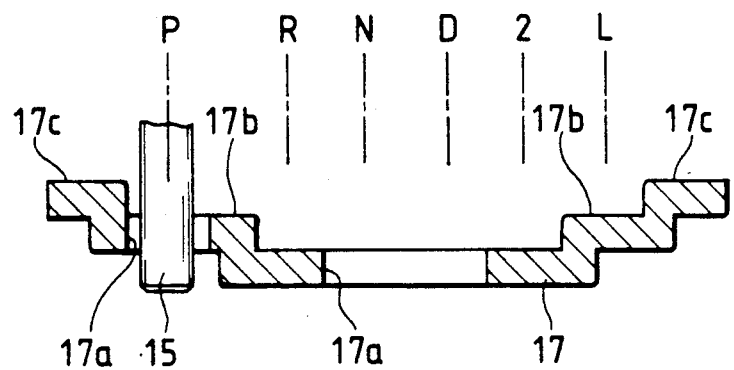
Figure 8:
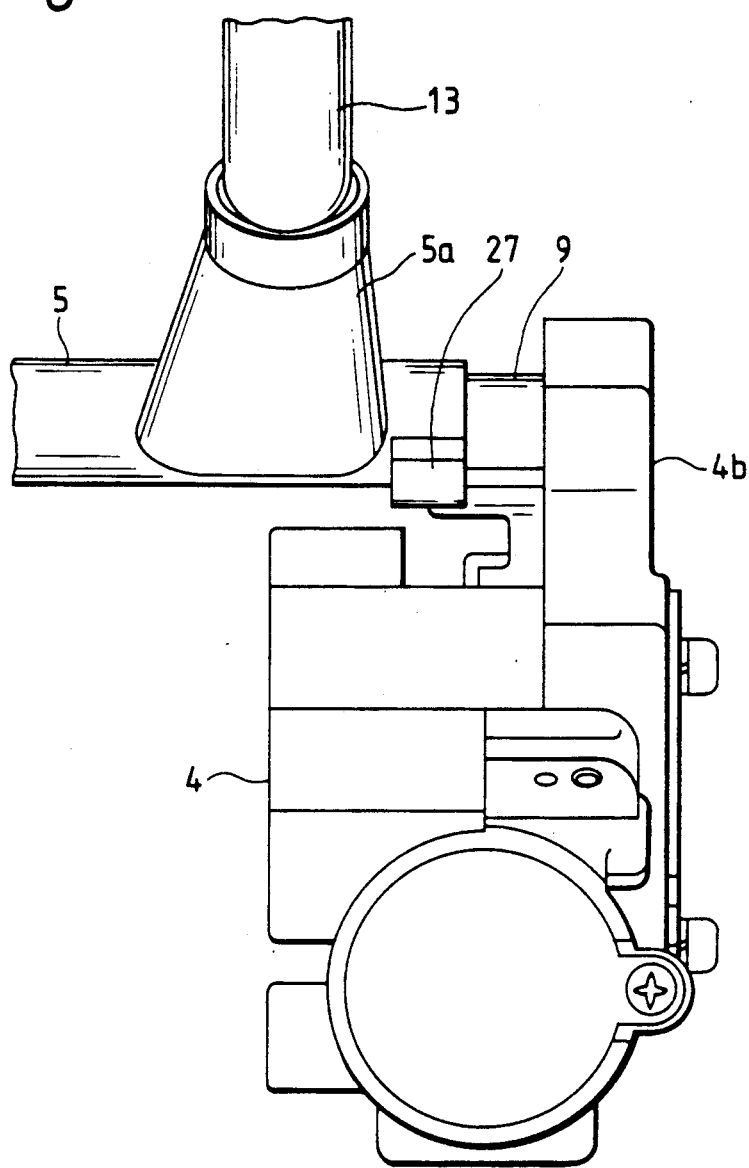
Figure 10:
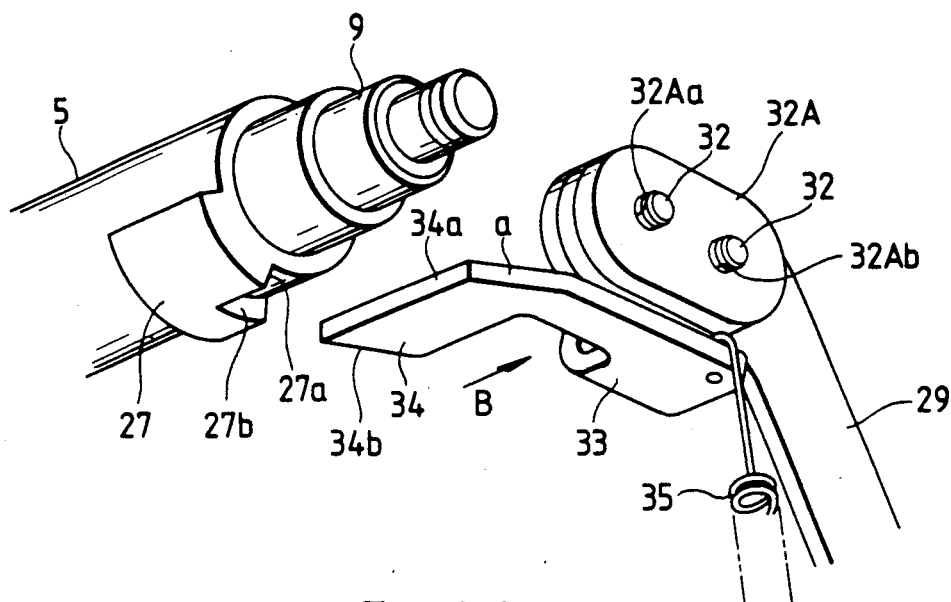
Figure 11:
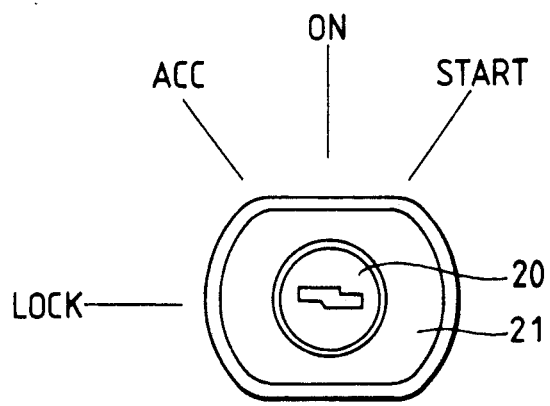

Let us consider the case where the shift lever 13 is set at the P position, and the key rotor 20 is set to the LOCK position ("off" position) as shown in FIG. 10. In this case, the detent pin 15 is confronted with the P position of the detent plate 17; that is, it is positioned in one of the cuts 17a, as shown in FIG. 6. On the other hand, the key rotor 20 is set at the LOCK position. Therefore, the drive cam 26 of the key rotor 20 is confronted with the groove 18a as shown in FIG. 1, and the drive part 31 of the first lever 29 is on the drive cam 26 of the key rotor 26 as shown in the part (a) of FIG. 12, so that the first and second levers 29 and 33 are displaced in the direction opposite to the direction of the arrow C as shown in FIG. 1. As a result, the front end face 34a of the lock member 34a of the second lever 33 is engaged with the step 27a of the lock part 27 formed on the front end portion of the shift shaft 5, while the rear side face 34b is engaged with the side wall of the lock member 27 (cf. FIG. 9). Hence, the shift lever 13 is locked so that it may not be moved in the shift direction (opposite to the direction of the arrow A) of the shift shaft nor in the select direction (the arrow D); that is, the shifting of the shift lever to other than the p position is positively prevented.

It goes without saying that, when the key rotor 20 is held at the LOCK position, the key can be freely inserted into or removed from the key rotor 20. In this case, the lock bar 24 is moved in the direction of the arrow E by the lock cam 22 with the aid of the compression spring 25, so that the its end portion is engaged with the engaging groove (not shown) of the steering shaft. Thus, the steering wheel is also locked.

When the key rotor 20 is set to any one of the ACC, ON and START positions ("on" position) with the key inserted therein, the driving cam 26 of the key rotor 20 is disengaged from the groove 18a as shown in the part (b) of FIG. 12. That is, the drive part 31 of the first lever 29 is disengaged from the drive cam 26, as a result of which the first and second levers 29 and 33 of the link mechanism 28 are swung in the direction of the arrow C by the elastic force of the tension spring 35. Hence, the lock member 34 of the second lever 33 is positioned outside the locus of the lock part 27 of the shift shaft 5. As a result, the shift lever 13 can be moved in the shift direction (opposite to the arrow A) of the shift shaft 5 or in the select direction (the arrow D); that is, the shift lever 13 can be set to a desired position.

In moving the shift lever from the P position to the R position, or from the D position to the 2 or L position, or from the D position to the R position, and shifting it from the D or R position to the P position, first the shift shaft 5 is moved in the shift direction (opposite to the direction of the arrow A) with the shift lever 13 so that the detent pint 15 is moved away from the side of the cut 17a or protrusion 17b of the detent plate 17, and then the shift lever 13 is turned in the shift direction (the direction of the arrow D).

When it is tried to turn the key rotor 20 from the ACC position to the LOCK position with the shift lever 13 set at any one of the R, D, 2 and L positions (other than the P position), the drive cam 26 is abutted against the drive part 31 as shown in the part (b) of FIG. 12 so as to turn the first and second levers 29 and 33 in the direction opposite to the direction of the arrow C; however, the lock member 34 is abutted against the outer surface of the lock part 27 of the shift shaft 5, so that the full stroke turn of the first and second levers 29 and 33 fully is inhibited. Hence, the key rotor 20 is held at the ACC position; that is, it cannot be turned to the LOCK position ("off" position). Accordingly, the difficulty is completely eliminated that the key is carelessly removed from the key rotor 20 with the shift lever 13 held at any one of the positions other than the P position. Thus, when the operator leaves his automobile with the key removed from the key rotor 20, he naturally performs the operation of shifting the shift lever 13 to the P position. This will eliminate all the difficulties which may occur when, with the shift lever held at other than the P position, the operator removes the key from the key rotor and leaves the automobile. That is, the operator can eliminate the difficulties without paying particular attention to those operations.

In the above-described first embodiment, the body 4 mounted on the steering column (not shown), the shift shaft 5, the lock part 27 provided on the shift shaft 5, and the link mechanism 28 made up of the first and second levers 29 and 33 have dimensional errors when manufactured. Therefore, if they are merely assembled, then those dimensional errors are so accumulated that correction operation cannot be expected. However, in the above-described embodiment, the link mechanism 28 is made up of the first and second levers 29 and 33; more specifically, the first and second levers 29 and 33 are coupled with the adjusting means comprising the round hole 29a and the elongated holes 29b, 333a and 33b of these levers 29 and 33, the screws 31 and the adjusting board 32A. Therefore, the second lever 33 can be adjusted in position with respect to the first lever 29. Accordingly, the positional relationship between the drive part 31 of the first lever 29 and the drive cam 16 of the key rotor 20, and the positional relationship between the lock member 34 of the second lever 33 and the lock part 27 of the shift shaft 5 can be adjusted correct, as a result of which the operation is performed correctly as initially required.

As was described above, the lever locking device can be formed simple in construction with the link mechanism 28 made up of the first and second levers 29 and 33, and the o assembling errors due to the manufacturing errors of the components can be absorbed merely by adjusting the positions of the screws coupling the first and second levers 29 and 33. With the embodiment, the operator will naturally shift the shift lever to the P position when leaving his automobile. This will positively eliminate the difficulties accompanying the prior art which allows the operator to leave the automobile with the shift lever held at a position other than the P position.

A second embodiment of the invention is as shown in FIGS. 13 through 15. The second embodiment is different from the first embodiment as follows: In the second embodiment, in order to link the driving cam 26 of the key rotor 20 and the lock part 27 of the shift shaft 5 with each other, a link mechanism 36 different from that in the first embodiment is employed. One end portion of a first lever 37, which is swingably supported through a pin 30 on the body 4, is similar in construction to that in the first embodiment; and the other end portion has a protrusion 37a at the end in such a manner that the protrusion 37a is extended upwardly. A second lever 38 has a round hole 38a in the base portion, and an elongated hole 37b is formed in the first lever 37 in correspondence to the round hole 38a. The first and second levers are linked with each other with a pin 40 inserted through a washer 39 into the round hole 38a and the elongated hole 37b, in such a manner that the base portion of the second lever 38 is slidably movable along the elongated hole 37b swinging about the protrusion 37. A plurality of saw-tooth-shaped protrusions 41 are formed on the surface 37c of the first lever 37 which is confronted with the second lever in such a manner that they are located near the elongated hole 37b. An adjusting mechanism, namely, a leaf spring 42 with its base end engaged with a hole 37d is confronted with the protrusions 41 in such a manner that its end is engaged with one of the protrusions 41.

When, in the second embodiment thus constructed, the second lever 38 is displaced in the direction of the arrow G with respect to the first lever 37, the lock member 34 at the end of the second lever 38 is moved towards the lock part 27 of the shift shaft 5 while the end of the leaf spring 42 is engaging with the protrusions 41 one after another, so that the distance between the lock member 34 and the lock part 27 is changed; that is, the second lever 38 is adjusted in position with respect to the first lever 37, and fixed there. Thus, the adjustment can be achieved more readily than in the second embodiment.

FIGS. 16 through 21 show a third embodiment of the invention. The third embodiment is different from the above-described first embodiment only in the following points:

In the third embodiment, a body 50 is integral with a cylindrical part 51 having a flange 52 at the end. The flange 52 is secured to a steering tube 53 which is provided for the steering column (not shown). A lock bar 55 is slidably held in the cylindrical part 51. The lock bar 55 is moved by the cam part 54a of a lock cam 54 (FIGS. 20 and 21), which is turned with the key rotor 20. An engaging groove 56a is formed in the steering shaft 56 in such a manner as to confront with the end of the lock bar 56 (as shown in FIG. 17).

A driving cam 57 is provided for the lock cam 54 near the key rotor 20. A drive part, namely, a shaft member 58 is slidably held in a hole 50a formed in the body 50 with its one end in slide contact with the driving cam 57 of the lock cam 54. A lever 60 is swingably supported through a pin 59 on the body 50 in such a manner that one end portion of the lever 60 is abutted against the other end of the shaft member 58. An adjusting part 61 having a rectangular hole 61a is coupled to the other end portion of the lever 60. Adjusting means, namely, a rectangular adjusting member 62 is slidably provided in the adjusting part 61, and it is fixed with a screw 63 after adjusted in position.

The steering column (not shown) has a cylindrical member 64 in which the shift shaft 5 is extended. The cylindrical member 64 is integral with a guide cylinder 65 in such a manner that the latter is perpendicular to the former. A lock member, namely, a shift lock bar 66 is slidably laid o in the guide cylinder 65, and is urged by a compression coil spring 67 in the direction of the arrow H at all times. The shift shaft 5 has a lock part which is a through-hole 68 with which the end portion of the shift lock bar 66, when shifted to the P position. The base end portion of the lock bar 66 is abutted against the adjusting member 62 of the lever 60 by the elastic force of the compression coil spring 67 at all times. The above-described shaft member 58, lever 60 and shift lock bar 66 form a link mechanism 69.

When, in the third embodiment thus constructed, the key rotor 20 is turned to the LOCK position as shown in FIGS. 16 and 18, and the shift lever 12 is shifted to the P position, the shaft member 58 is moved in the direction of the arrow I by the driving cam 57, the lever 60 is turned in the direction of the arrow J, and the shift lock lever 66 is moved in the direction opposite to the direction of the arrow H against the elastic force of the compression coil spring 57, so that the end portion of the shift lock lever 66 is inserted into the through-hole 68 formed in the shift shaft 5. That is, the shift shaft 5 and the shift lever 13 are locked so that they may not be movable in the shift direction nor in the select direction. In this case, the end portion of the lock bar 55 is engaged with the engaging groove 56a of the steering shaft 56, to prevent the rotation of the latter 56.

When, under this condition, the key rotor is turned, for instance, to the ACC position with the key (not shown), the lock bar 55 is moved in the direction of the arrow K by the action of the lock cam 54, thus being disengaged from the engaging groove 56a, while the shaft member 58 is disengaged from the driving cam 57, so that the lever 60 is turned in the direction opposite to the arrow J while the shift lock bar 66 is moved in the direction of the arrow H by the elastic force of the compression coil spring 67, thus being disengaged from the through hole. As a result, the shift shaft 5 and the shift lever 13 may be turned in the shift direction and in the select direction.

When the key rotor 20 is turned, for instance, to the ACC position, and the shift shaft 5 is set at any one of the positions other than the P position, the end portion of the shift lock bar 66 is abutted against the outer wall of the shift shaft 5, thus limiting the movement of the shaft member 58 in the direction of the arrow I. Accordingly, the turning of the key rotor from the ACC position to the LOCK position is prevented.

In the above-described third embodiment, the positional errors of the body 50, the shift shaft 5 and the steering tube 53 with respect to the steering column, and the assembling errors attributing to the dimensional errors of the components are absorbed by the above-described simple operation that the adjusting mechanism, or the adjusting member 62 is fixed with the screw 63 after adjusted in position, with the results that the device is operated as required at all times, and can be assembled and adjusted with ease.

FIGS. 22 through 32 show a fourth embodiment of the invention. The fourth embodiment is different from the first embodiment in the following points:

In the fourth embodiment, its body 80 is relatively similar in configuration to the body 4 in the first embodiment. The upper end portion of the shift shaft 5 is rotatably engaged with a supporting hole 81a formed in an arm 81 extended from the body 80. A shaft hole 80a is formed in the body 80 in such a manner as to confront with the drive cam 26 of the key rotor 20. A shaft member 82 is slidably inserted into the hole 80a thus formed. The middle part of a lever 83, namely, a shaft part 83a, is rotatably supported by a supporting part 80b of the body 80 in such a manner that one end portion 83b of the lever 83 is abutted against the shaft member 81. A cam ring 84 is rotatably supported on the outer cylindrical wall of the rear end portion of the body 80 with the aid of a spacer 85 as shown in FIGS. 26 and 27.

An interlocking shaft 87 with a first lever 87a and a second lever 87b is rotatably mounted on a shaft member 86 (cf. FIG. 32) which is provided for the steering column (not shown), in such a manner that the end portion of the first lever 87a is abutted against a drive protrusion 84b formed on the cam ring 84. An adjusting mechanism, namely, a screw 88 is engaged with the end portion of the second lever 87b.

As shown in FIGS. 30 through 32, a cylindrical member 89, in to which the shift shaft 5 is inserted, is provided for the steering column (not shown). A guide cylinder 90 is extended from the cylindrical member 89 in such a manner that the former is perpendicular to the latter. A lock member, namely, a shift lock bar 91 is slidably fitted in the guide cylinder 90, and it is urged by a compression coil spring 92 in the direction of the arrow P at all times. The shift shaft 5 has a lock part, namely, a through-hole 93 into which the end portion of the shift lock bar 91 is inserted when the shift shaft 5 is set to the P position. The base end of the shift lock board is kept abutted against the end of the screw 88 by the elastic force of the compression coil spring 92, which screw is engaged with the second lever 87b as was described above. The above-described shaft member 82, lever 83, cam ring 84, interlocking shaft 87 and shift lock bar 91 form a link mechanism 94.

When the key rotor 20 is turned to the LOCK position, and the shift lever 13 is set at the P position as shown in FIGS. 22, 28 and 30, the shaft member 82 is moved by the drive cam 16 in the direction of the arrow L, the lever 83 is turned in the direction of the arrow M, the cam ring 84 is turned in the direction of the arrow N, and the interlocking shaft 87 is turned in the direction of the arrow 0. Accordingly, the shift lock bar 91 is moved in the direction opposite to the direction of the arrow P against the elastic force of the compression coil spring 92, so that the end portion of the shift lock bard 91 is inserted into the through-hole 93 formed in the shift shaft 5. Hence, the shift shaft 5 and the shift lever 13 are locked so that they may not be movable in the shift direction nor in the select direction. In this operation, the end portion of the lock bar 24 is engaged with the engaging groove of the steering shaft (not shown), thus preventing the rotation of the steering shaft.

When, under this condition, the key rotor 20 is turned to the ACC position for instance, the lock bar 24 is moved by the lock cam 22 in the direction opposite to the arrow E, thus being disengaged from the engaging groove (not shown) formed in the steering shaft. As a result, the shaft member 82 is disengaged from the drive cam 26, the lever 83 is turned in the direction opposite to the direction of the arrow M, the cam ring 84 is turned in the direction opposite to the direction of the arrow N, and the interlocking shaft 87 is turned in the direction opposite to the direction of the arrow 0. Accordingly, the shift lock bar 9s is moved in the direction of the arrow K by the elastic force of the compression coil spring 92, so that the end portion of the shift lock bar 91 is disengaged from the through-hole 93, thus confronting with the outer cylindrical wall of the shift shaft 5. Thus, the shift shaft 5 and the shift lever 13 are allowed to move in the shift direction and in the select direction. When the key rotor 20 is turned to the ACC position for instance, end of the shift lock bar 91 is abutted against the outer cylindrical wall of the steering shaft (not shown), to prevent the movement of the shaft member 82 in the direction of the arrow L. Hence, the key rotor 20 cannot be turned from the ACC position to the LOCK position.

In the above-described fourth embodiment, the assembling errors of the body 80 and the shift shaft 5 with respect to the steering column, and the assembling errors attributing to the dimensional errors of the components are absorbed simply by operating the adjusting mechanism, or the screw 88, with the results that the device is operated as required at all times, and can be assembled and adjusted with ease.

In the above-described embodiments, the steering shaft is locked with the key rotor set at the LOCK position. However, it should be noted that the technical concept of the invention is applicable to the case where the key rotor is off at the LOCK position, and the steering wheel is not locked, or no ACC position is provided, and the key rotor is on at the ACC position.

As was described above, the adjusting mechanism is provided for the lever which is at least a part of the link mechanism. The adjusting mechanism absorbs the errors which may be involved in assembling work. Thus, the shift lever locking device can be assembled and adjusted with ease so that it operates as required.

While there has been described in connection with the preferred embodiments of the invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A shift lever locking device for an automatic transmission of column type having a body member mounted on a steering column, comprising:

a key rotor mounted on said body, said key rotor being turnable between an off position where a key can be engaged with and disengaged from said key rotor and a on position where said key cannot be disengaged from said key rotor;

a driving cam turned with said key rotor;

a shift shaft arranged along said steering column, said shift shaft being turned by operating a shift lever so that said automatic transmission is shifted to a plurality of positions;

a lock part formed on said shift shaft;

a link mechanism provided movably which has at least a lever which is swung to operate in a link mode a drive part confronting with said driving cam of said key rotor and a lock member confronting with said lock part of said shift shaft; and an adjusting mechanism provided for said lever of said link mechanism to adjust the positional relationships between said driving cam and said drive part and between said lock part and said lock member, wherein when said shift shaft is shifted to a particular position, said key rotor being allowed to be turned to an off position, so that said shift shaft is locked at said particular position with the aid of said lock part and said lock member, and when, with said key rotor at the on position, said shift lever is shifted to a position other than said particular position, said drive part preventing said driving cam from rotation thereby to prevent said key rotor from being turned to the off position.

2. The shift lever locking device according to claim 1, wherein said link mechanism comprises a first lever supported rotatably on said body and a second lever, one end portion of said first lever having said drive part and the other end of said first lever being coupled to one end of said second lever with said adjudting member, the other end portion of said second lever having said lock member.

3. The shift lever locking device according to claim 1, wherein said adjusting mechanism comprises screws and an adjusting board, said adjusting board having thereaded holes.

4. The shift lever locking device according to claim 2, wherein said first lever has a round hole and an elongated hole and said second lever has two elongated holes, one of said screws being screwed through the round hole of said first lever and the elongated hole of said second lever into one of said threaded holes of said adjusting board, the other screw being screwed through the elongated hole of said first lever and the elongated hole of said second lever into the other threaded hole of said adjusting board so that said second lever can be adjusted in swing and in length with respect to said first lever.

5. The shift lever locking device according to the claim 1, wherein said link mechanism comprises a first lever rotatably supported to said body and a second lever, one end portion of said first lever having a drive part and confronting with said driving cam and the other end of said first lever having a protrusion in such a manner that said protrusion is extended upwardly.

6. The shift lever locking device according to claim 5, wherein a based portion of said second lever has a round hole and said first lever has an elongated hole in correspondence to said round hole, said first and second levers being linked with each other with a pin member inserted through a washer member into said round hole and said elongated hole, in such a manner that a based portion of said second lever is slidably movable along said elongated hole swinging about said protrusion.

7. The shift lever locking device according to claim 5, wherein said adjusting mechanism comprises a plurality of saw-tooth-shaped protrusions formed on a surface of said first lever which is confronted with said second lever, and a leaf spring with its base end engaged with a hole of said second lever being confronted with said protrusions in such a manner that an end portion of said leaf spring is engaged with one of said protrusions.

8. The shift lever locking device according to claim 1, wherein said link mechanism comprises a shaft member slidably supported to a hole formed in said body with its one end in slide contact with said driving cam, a lever supported to said body and one end portion of said lever being abutted against the other end of said shaft member, and a shift lock bar, one end of said shift lock bar being coupled to the other end of said lever with said adjusting member and the other end of said shift lock bar having said lock member confronting with said lock part of said shift shaft.

9. The shift lever locking device according to claim 8, wherein said link mechanism further comprises a cylindrical member in which said shift shaft is extended, a guide cylinder provided integrally with said cylindrical member and said shift lock bar being slidably provided to said guide cylinder, and a spring means provided to said guide cylinder for urging said shift lock bar.

10. The shift lever locking device according to claim 1, wherein said link mechanism comprises a shaft member slidably provided in a hole formed in said body with its end in slide contact with said driving cam, a middle part of a lever being rotatably supported to said body in such a manner that one end portion of said lever is abutted against said shaft member, a cam ring rotatably supported to said steering column and having a drive protrusion in which the other end of said lever is abutted against said drive protrusion, an interlocking shaft provided to a shaft member formed on said steering wheel and having a first lever and a second lever in which the end portion of said first lever is abutted against said drive protrusion and the end portion of said second lever has said adjusting member, and a shift lock bar of which one end portion is abutted against said second lever with said adjusting member and the other end portion has said lock member.

11. The shift lever locking device according to claim 10, wherein said adjusting member comprises of a screw.

12. The shift lever locking device according to claim 10, wherein said link mechanism further comprises a cylindrical member in which said shift shaft is extended, a guide cylinder provided integrally with said cylindrical member and said shift lock bar being slidably provided to said guide cylinder, and a spring means provided to said guide cylinder for urging said shift lock bar.

* * * * *

UNITED STATES PATENT AND TRADEMARK OFFICE
CERTIFICATE OF CORRECTION

PATENT NO. : 5,050,411
DATED : September 24, 1991
INVENTOR(S) : Tomonori Kawachi et al.

It is certified that error appears in the above-identified patent and that said Letters Patent is hereby corrected as shown below:

Claim 1, column 10, line 29, before "on" change "a" to --an--.

Claim 2, column 10, line 62, change "adjudting" to --adjusting--.

Claim 3, column 10, line 68, change "thereaded" to --threaded--.

Claim 4, column 11, line 9, change "thereaded" to --threaded--.

Signed and Sealed this

Twenty-fifth Day of May, 1993

Attest:

MICHAEL K. KIRK

Attesting Officer    Acting Commissioner of Patents and Trademarks